(12) United States Patent
Luzzi et al.

(10) Patent No.: US 7,602,219 B2
(45) Date of Patent: Oct. 13, 2009

(54) INVERTING CELL

(75) Inventors: Raimondo Luzzi, Graz (AT); Marco Bucci, Graz (AT)

(73) Assignee: Infineon Technologies AG (DE)

( * ) Notice: Subject to any disclaimer, the term of this patent is extended or adjusted under 35 U.S.C. 154(b) by 45 days.

(21) Appl. No.: 12/034,298

(22) Filed: Feb. 20, 2008

(65) Prior Publication Data
US 2009/0206937 A1      Aug. 20, 2009

(51) Int. Cl.
| | |
|---|---|
| G06F 7/58 | (2006.01) |
| H03B 5/24 | (2006.01) |
| H03B 29/00 | (2006.01) |
| H03H 11/16 | (2006.01) |
| H03K 3/03 | (2006.01) |
| H03K 19/094 | (2006.01) |
| H03K 19/0944 | (2006.01) |
| H03K 19/0948 | (2006.01) |

(52) U.S. Cl. .............. 326/121; 326/122; 327/256; 331/57; 331/78; 708/251

(58) Field of Classification Search ............ 331/57, 331/78; 326/104, 112, 119–125, 129; 327/231, 327/256, 257; 708/250–256
See application file for complete search history.

(56) References Cited

U.S. PATENT DOCUMENTS
4,700,089 A * 10/1987 Fujii et al. ............... 327/288

* cited by examiner

*Primary Examiner*—David Mis
(74) *Attorney, Agent, or Firm*—Dickstein, Shapiro, LLP.

(57) ABSTRACT

An inverting cell including a first inverter having first and second inputs; a second inverter having first and second inputs, wherein the second input of the second inverter is connected to the first input of the first inverter and the output of the first and second inverters is connected to the second input of the first inverter; and a third inverter connected between the output of the first and second inverters and the first input of the second inverter.

13 Claims, 5 Drawing Sheets

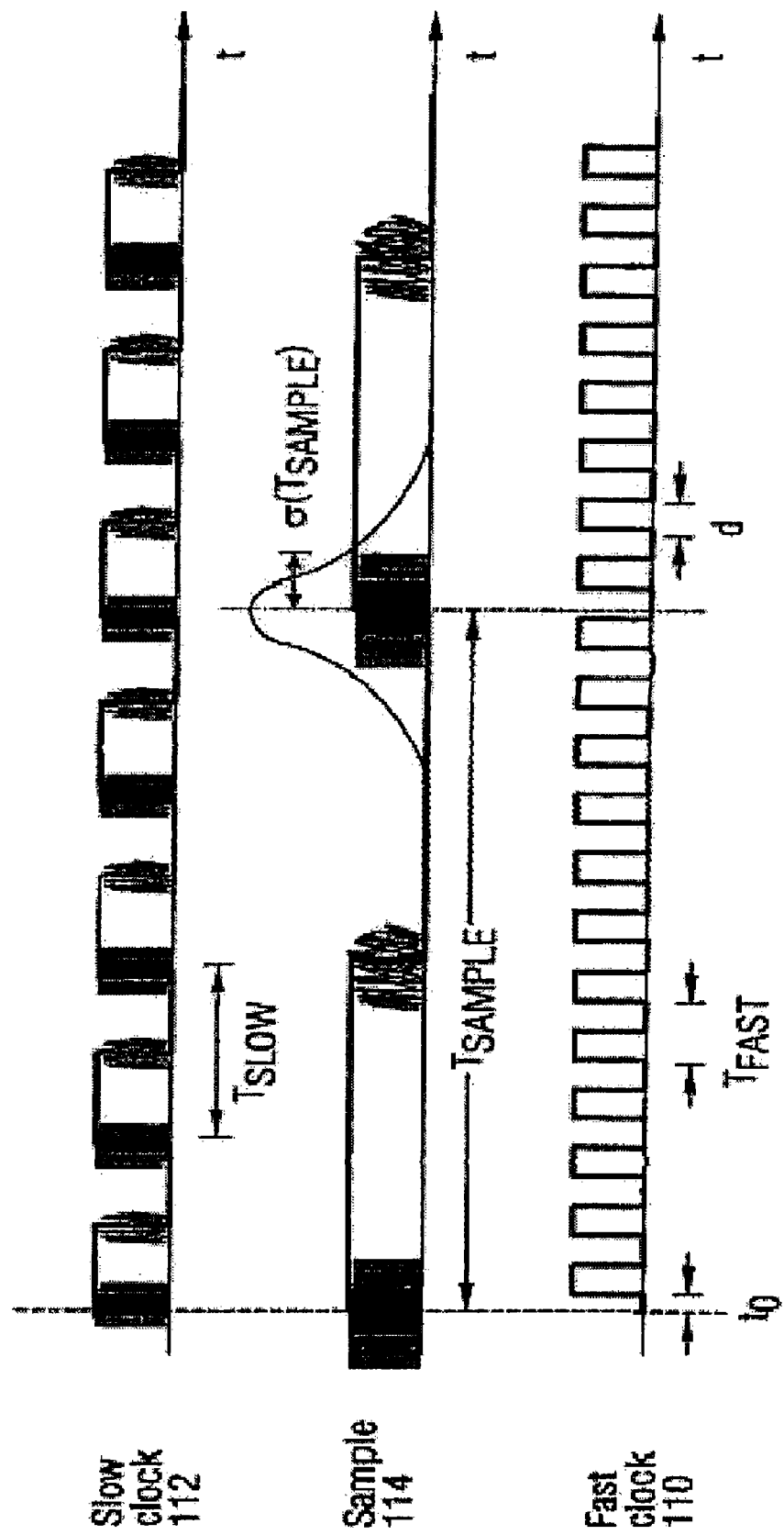

INVERTING CELL

FIELD OF THE INVENTION

The present invention relates generally to digital ring oscillators used in random bit generators, and, in particular, an inverting cell used in a ring oscillator.

BACKGROUND OF THE INVENTION

Symmetric and asymmetric ciphering algorithms require a high quality random number source for key generation. Random numbers are also used for generating challenges in authentication protocols, to create padding bytes and blinding values for random masking.

A random bit generator (RBG) is a system whose output consists of fully unpredictable (i.e. statistically independent and unbiased) bits. Oscillator based random bit generators (RBG) employ a "slow" oscillator ($T_{slow}$) which samples a "fast" oscillator ($T_{fast}$). In order to generate high quality bits, the slow oscillator jitter must be sufficiently greater than the fast oscillator period $T_{fast}$.

Even if pseudo random number generators (PRNG) based on cryptographic secure deterministic algorithms can be employed for these purposes, a physical source of true randomness is needed for algorithm seeding. For this reason, a cryptographic token, like a chip-card, must also feature a true random number generator (RNG) among its peripheral devices.

The main feature of a high-quality randomness source is the unpredictability of the produced bit stream. An observer or even attacker must not be able to carry out any useful prediction about the true RNG output even if the design of the RNG is known.

A true RNG generates a random bit stream from a non-deterministic natural source like electronic noise or radioactive decay. Indeed, in an integrated implementation, electronic noise sources like thermal or shot noise are the only stochastic processes that can be exploited.

One technique for generating random bit streams is jittered oscillator sampling. A true RNG based on jittered oscillator sampling, basically, includes two free running oscillators and a sampling element like a single D-type flip-flop. An output signal from a slower of the two oscillators samples an output of the faster of the two oscillators, thus generating a bit stream. The resulting bit sequence derives from the oscillators mean frequency ratio and their cycle-to-cycle jitter. Properly chosen frequency ratios lead to bit streams that seem to be more random when statistical randomness tests are applied. Nevertheless, the output bit entropy is due to the oscillator's jitter being the only randomness source in such a system. If the sample signal of the fast oscillator features an unbalanced mean value, this in turn gives rise to an unbalanced mean value on the output bit stream or to an increase in its bit-to-bit correlation, according to the adopted sampling element. Moreover, periodic disturbances like a system clock can synchronize the sampling oscillator, thus dramatically reducing its jitter.

FIG. 1 shows a schematic view of a jittered oscillator sampling based RNG 100. RNG source 100 comprises a high-frequency oscillator 102, a low-frequency oscillator 104, a prescaler 106 and a sampler 108. The sampler 108 is a D-flip-flop. The high-frequency oscillator 102 generates a fast clock signal 110 which is a data input to the sampler 108. The low-frequency oscillator 104 generates a slow clock signal 112 which is prescaled by the prescaler 106. The prescaler 106 outputs a sample signal 114 which is an input to a clock input of the sampler 108. The sampler 108 samples the fast clock signal 110 on a rising edge of the sample signal 114 and outputs a random bit 116 which depends on a sampling state of the fast clock signal 110 while being sampled. Here, successive random bits 116 are an input to a digital post-processor 120 which outputs a random bit stream 122.

FIG. 2 shows characteristics of the fast clock signal 110, the slow clock signal 112 and the sample signal 114, as they are shown in FIG. 1. The fast clock signal 110 has a period $T_{fast}$ and a duty cycle d. The slow clock signal 112 has a period $T_{slow}$. Edges of the slow clock signal 112 comprise a jitter. The sample signal 114 is generated from the slow clock signal 112 by prescaling the sample signal 112 by a factor defined in the prescaler. Here the slow clock signal 112 is prescaled by a factor of 4. As the sample signal 114 is generated from the slow clock signal 112, the edge of the sample signal 114 also comprises a jitter. A period of the sample signal 114 is $T_{SAMPLE}$ and a standard deviation of the jitter of the sample signal 114 is $\sigma(T_{SAMPLE})$. Edges of the sample signal 114 and the fast clock signal 110 are not synchronized. Here the edge of the fast clock signal 110 occurs by a time period no later than the edge of the sample signal 114. Frequency beating of the two free running oscillators 102, 104 (shown in FIG. 1) generates a non-white noise signal. This is especially a problem in a standard-cell based RNG where typically the jitter has a low intensity. Moreover, an unbalanced random bit stream 122 is obtained if the duty cycle d of the fast clock signal 110 is unbalanced. A relative jitter with respect to the fast clock signal is helpful.

The entropy of the random values output by the random number generator is due to the relative jitter between the sample signal 114 and the sampled signal 112. However, the jitter-to-mean-period ratio is usually quite small so that the distribution of the random values is not as uniform as desired. One way to increase random stream quality is to increase the frequency of the fast clock signal 112. However, the frequency of the fast clock signal 112 cannot be increased indefinitely because of limits in implementing high-frequency oscillators. Another way to increase the random stream quality is to increase the jitter-to-mean-period ratio of the sample signal 114 by means of an amplified noise source inside the fast clock signal. This approach, however, results in an increase in chip area and power required for implementation.

SUMMARY OF THE INVENTION

The present invention provides an inverting cell including a first inverter having first and second inputs; a second inverter having first and second inputs, wherein the second input of the second inverter is connected to the first input of the first inverter and the output of the first and second inverters is connected to the second input of the first inverter; and a third inverter connected between the output of the first and second inverters and the first input of the second inverter.

These and further features and advantages of the present invention will become more apparent from the following description taken in connection with the accompanying drawings which show, for purposes of illustration only, an embodiment in accordance with the present invention.

BRIEF DESCRIPTION OF THE DRAWINGS

FIG. 2 shows a characteristic of signals of the random number generator source shown in FIG. 1;

DETAILED DESCRIPTION OF PREFERRED EMBODIMENT

FIGS. 1-5, discussed below, and the embodiment used to describe the principles of the present invention are by way of illustration only and should not be construed in any way to limit the scope of the invention. Well-known circuits have been shown in block diagram form in order not to obscure the present invention in unnecessary detail. Certain details regarding components of the random bit generators described herein have been omitted insomuch as such details are not necessary to obtain a complete understanding of the present invention and are within the skill of a person of ordinary skill in the relevant art.

Figure 1:
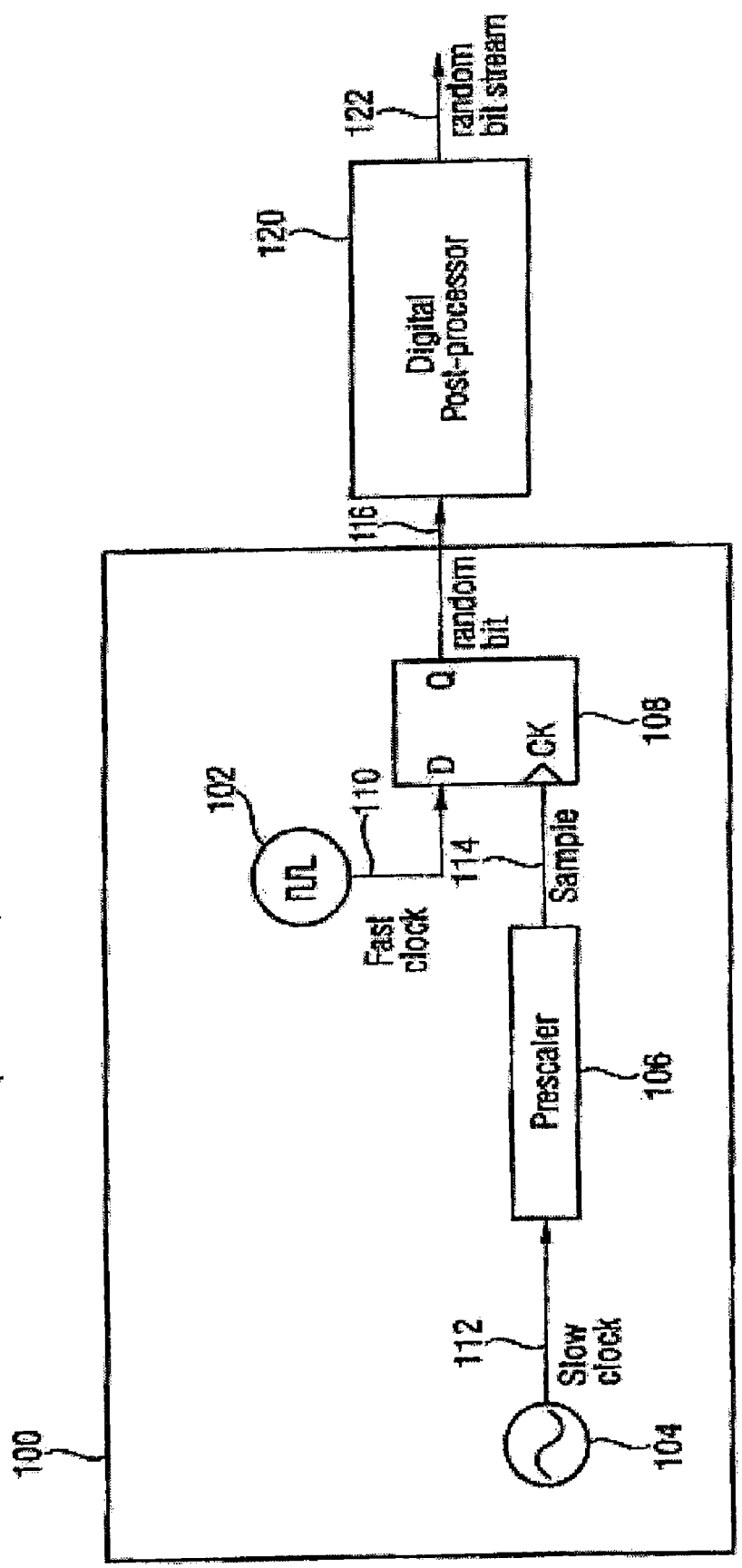
FIG. 1 shows a random number generator source.
Figure 3A:
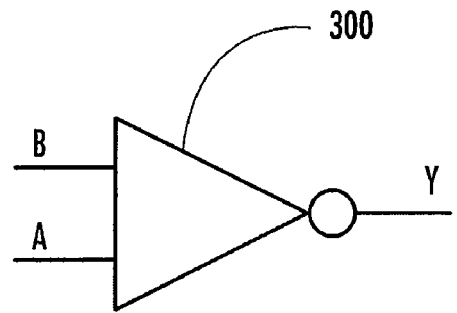
FIGS. 3A and 3B show a circuit diagram for a two-input inverter.

FIG. 3A shows a circuit diagram for a 2-input inverter 300. The operation of inverter 300 is discussed below with reference to the following truth table.

| A | B | Y |
|---|---|---|
| 0 | 0 | 1 |
| 0 | 1 | Z |
| 1 | 0 | Z |
| 1 | 1 | 0 |

When inputs A and B are different, output node Y is in high impedance. Conversely, when inputs A and B are equal, inverter 300 inverts the input signal. Thus, when inputs A and B are 0 output Y is 1, and when inputs A and B are 1 output Y is 0.

Figure 3B:
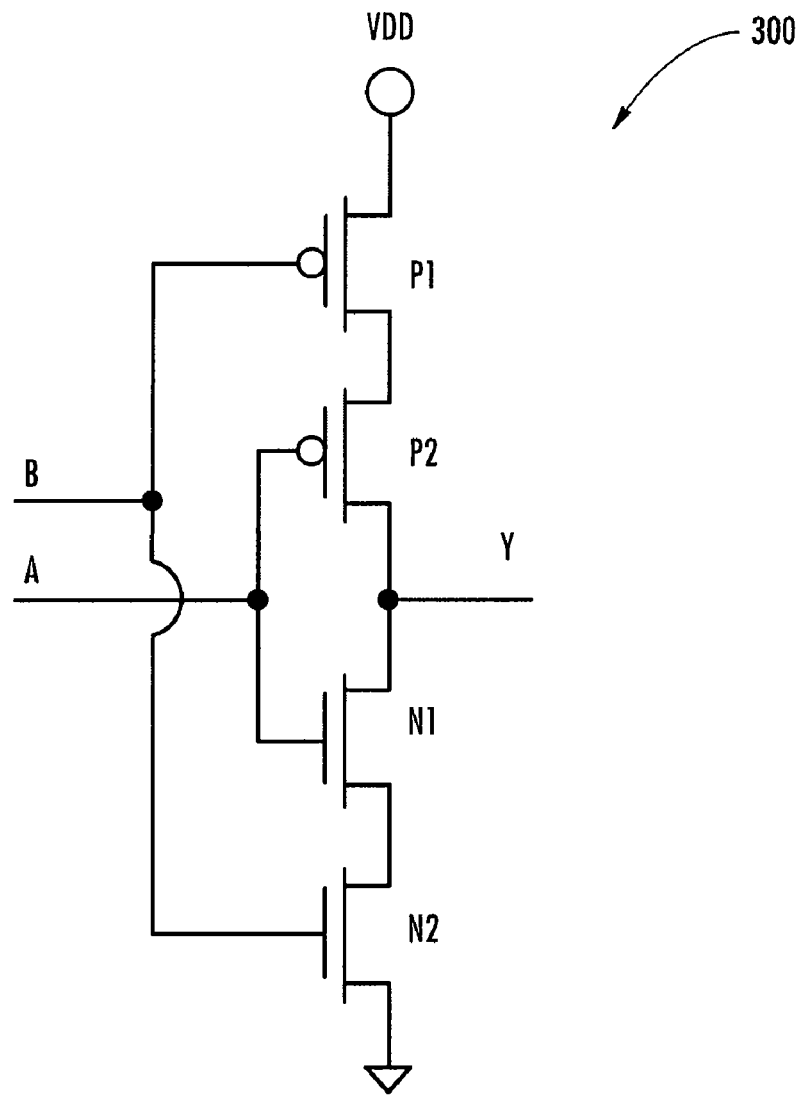

FIG. 3B shows inverter 300 constructed with two P-channel MOSFETS (P1 and P2) and two N-channel MOSFETS (N1 and N2) in accordance with one embodiment of the present invention. The source of P-channel MOSFET P1 is connected to VDD. The drain of P1 is connected to the source of P2 and the drain of P2 is connected to the drain of N1. The gate of P1 is connected to the gate of N2 and the gate of P2 is connected to the gate of N1. Inputs A and B are taken from the gates of P1 and P2, respectively. Output Y is taken from the connected drain of P2 and N1. The above described truth table with respect to FIG. 3A is applicable to FIG. 3B. Specifically, when inputs A and B are different, output node Y is in high impedance. Conversely, when inputs A and B are equal, inverter 300 inverts the input signal. Thus, when inputs A and B are 0 output Y is 1, and when inputs A and B are 1 output Y is 0.

Figure 4A:
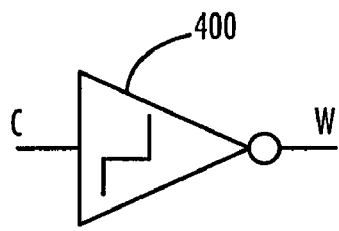
FIGS. 4A and 4B show a circuit diagram for an inverting cell with a dead-zone in accordance with the present invention.
Figure 4B:
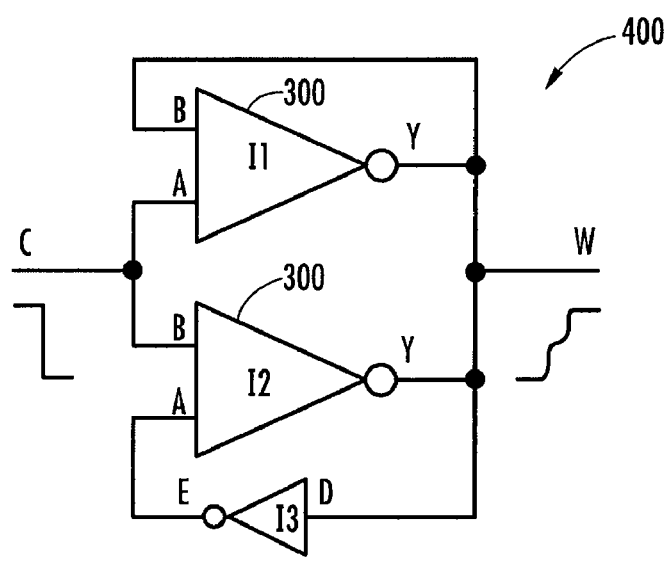
Figure 6:
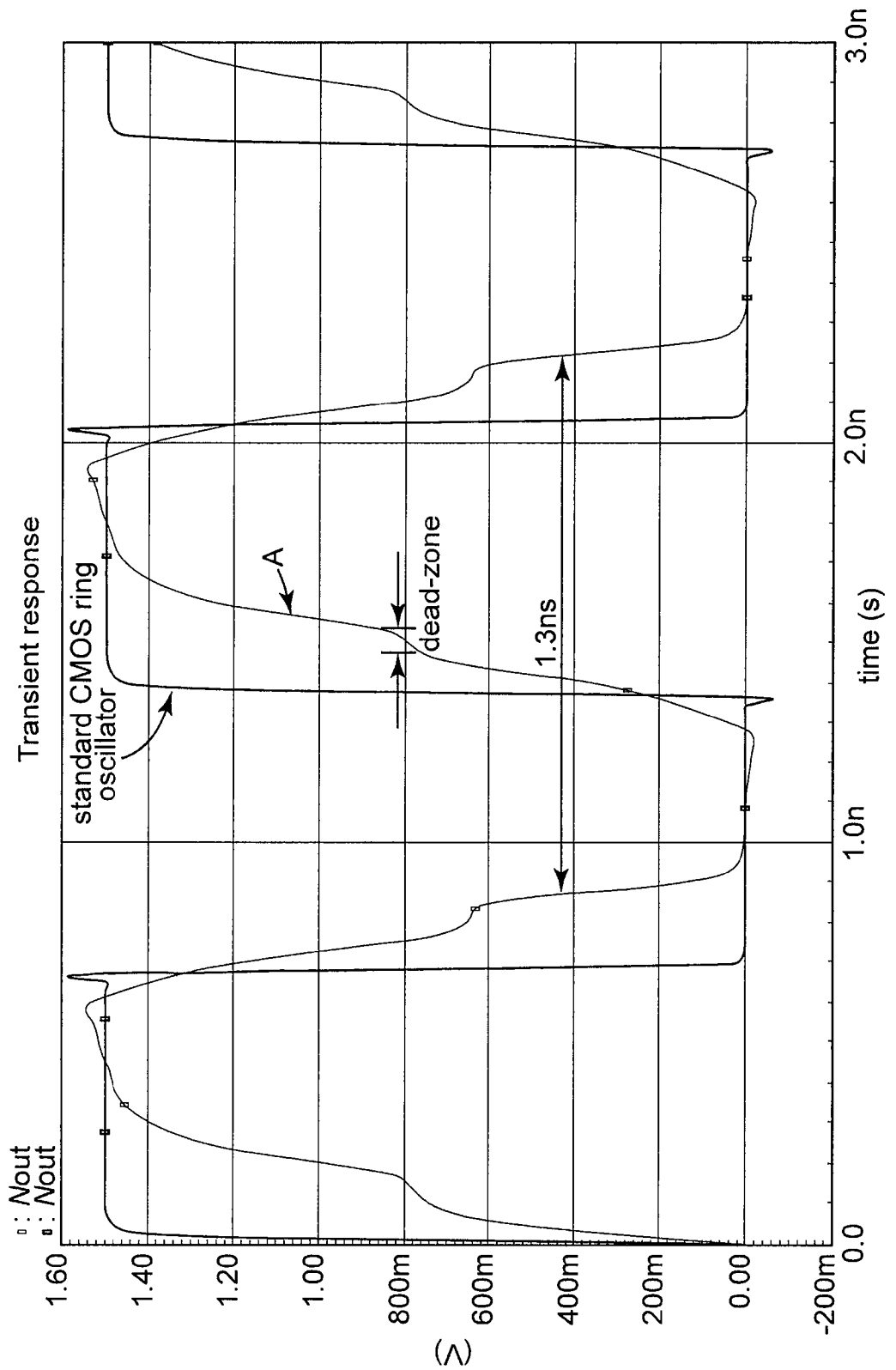
FIG. 6 shows a characteristic of the transient response of a ring oscillator having an inverting cell in comparison to a standard CMOS ring oscillator.

FIG. 4A shows an inverting cell 400 which has a "dead-zone" around the switching threshold. A "dead-zone", also commonly referred to as a "dead band", is defined as a zone in which the device output is in high impedance thus resulting in a temporary decrease in slope of the transient response waveform. An example of a "dead-zone" is shown in the transient response of the ring oscillator output in FIG. 6. Referring to FIG. 6, waveform A is the transient response of a ring oscillator having an inverting cell in accordance with an embodiment of the present invention. Also shown is the transient response of a standard CMOS ring oscillator without a dead-zone. Referring to FIG. 4B, inverting cell 400 is implemented using inverters I1-I3, where inverters I1 and I2 are characteristic of inverter 300 discussed above with respect to FIGS. 3A and 3B. The operation of inverting cell 400 is discussed below with reference to the following truth table.

| C | W |
|---|---|
| 0 | 1 |
| 1 | 0 |

Inverting cell 400 includes a first inverter I1 having first and second inputs (A and B, respectively), a second inverter I2 having first and second inputs (A and B, respectively), and a third inverter connected between the output of the first and second inverters, I1 and I2, and the second input of the second inverter I2. The second input B of the second inverter I2 is connected to the first input A of the first inverter I1 and the output W of the first and second inverters, I1 and I2, is connected to the second input B of the first inverter I1. Input D of the third inverter I3 is connected to the second input B of the first inverter I1 and output E of the third inverter I3 is connected to the first input A of the second inverter I2.

On the falling edge of input signal C, inverter I1 has both first and second inputs (A and B) at 0 and, therefore, its output Y as well as output W of inverting cell 400 is driven to 1. Output W is fed back to the second input B of inverter I1. In response, inverter I1 goes in high impedance Z and output W remains floating close to VDD/2. Conversely, inverter I2 is initially in high impedance Z (inputs A and B: 0 and 1) and, when W reaches the inverter I3 threshold, inverter I2 drives W to 1, completing the output transition started by I1. Thus, inverting cell 400 has a dead-zone in its input-output characteristic about its switching threshold. In accordance with an alternative arrangement of the present invention, inverter I3 of inverting cell 400 can also take the form of inverter 300 having its first and second inputs short circuited.

Figure 5:
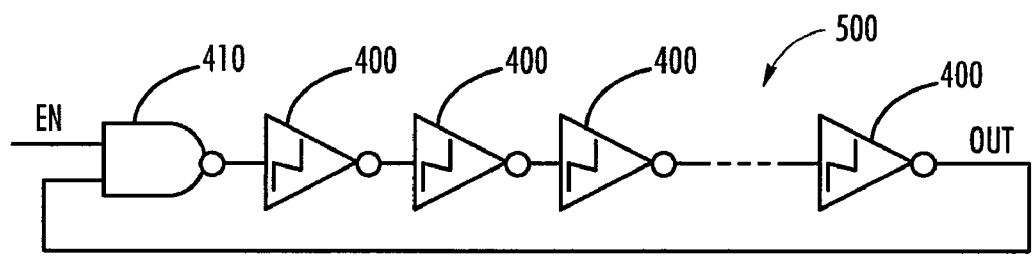
FIG. 5 shows a circuit diagram for a ring oscillator in accordance with the present invention.

Referring to FIG. 5, ring oscillator 500 is a cascade of an even number of inverting cells 400. NAND gate 410 has first and second inputs, one of the inputs is connected to an enabling unit (EN) of the random number generator. A plurality of (n) inverting cells 400 are connected in series to an output of the NAND gate, whereby (n) is an even integer and the output of the (nth) inverting cell is connected to the other of the NAND gate's input. Each inverting cell 400 of digital ring oscillator 500 has a dead-zone around the switching threshold. Since inverters I1 and I2 (FIG. 4B) do not show any shoot through current, that is a rush of current that occurs while both inverters I1 and I2 are on, ring oscillator 500 has a lower current consumption than that of previously known CMOS ring oscillators.

Ring oscillator 500 has an increased phase noise and a lower current consumption with respect to previously known CMOS inverter-based ring oscillators.

One skilled in the art will appreciate that additional variations may be made in the above-described embodiment of the present invention without departing from the spirit and scope of the invention which is defined by the claims which follow.

What is claimed is:

1. An inverting cell comprising:
   a first inverter having first and second inputs;
   a second inverter having first and second inputs, wherein the second input of the second inverter is connected to the first input of the first inverter and the output of the first and second inverters is connected to the second input of the first inverter; and a third inverter connected between the output of the first and second inverters and the first input of the second inverter.

2. The inverting cell of claim 1 wherein an input of the third inverter is connected to the second input of the first inverter and an output of the third inverter is connected to the first input of the second inverter.

3. The inverting cell of claim 1 wherein the third inverter has first and second short circuited inputs.

4. The inverting cell of claim 1 wherein the output of the first inverter is in high impedance when the first and second inputs of the first inverter are different.

5. The inverting cell of claim 1 wherein the inverting cell has a dead-zone about its switching threshold.

6. The inverting cell as in claim 1 wherein each of the first and second inverters have a high impedance output when their respective inputs are different.

7. The inverting cell as in claim 1 wherein the first and second inverters each comprise two P-channel MOSFETs and two N-channel MOSFETs.

8. The inverting cell as in claim 7 wherein the gate of one of the P-channel MOSFETs is connected to the gate of one of the N-channel MOSFETs and to one of the inverter inputs, and the gate of the other P-channel MOSFET is connected to the gate of the other N-channel MOSFET and to the other of the inverter inputs.

9. A digital ring oscillator comprising:
a NAND gate having first and second inputs; and
a plurality of (n) inverting cells as claimed in claim 1 connected in series to an output of the NAND gate, wherein n is an even integer and the output of the ($n^{th}$) inverting cell is connected to one of the first and second inputs of the NAND gate.

10. The digital ring oscillator of claim 9 wherein each inverting cell has a dead-zone in its input-output characteristic.

11. The digital ring oscillator of claim 9 wherein each inverting cell has a dead-zone about its switching threshold.

12. A random number generator having a digital ring oscillator comprising:
a NAND gate having first and second inputs; and
a plurality of (n) inverting cells connected in series to an output of the NAND gate, wherein n is an even integer and the output of the ($n^{th}$) inverting cell is connected to one of the first and second inputs of the NAND gate, wherein each of the inverting cells comprises:
a first inverter having first and second inputs;
a second inverter having first and second inputs, wherein the second input of the second inverter is connected to the first input of the first inverter and the output of the first and second inverters is connected to the second input of the first inverter; and
a third inverter connected between the output of the first and second inverters and the first input of the second inverter.

13. The random number generator as in claim 12, further comprising an enabling unit connected to the other of the first and second inputs of the NAND gate.

\* \* \* \* \*